UNITED STATES PATENT OFFICE.

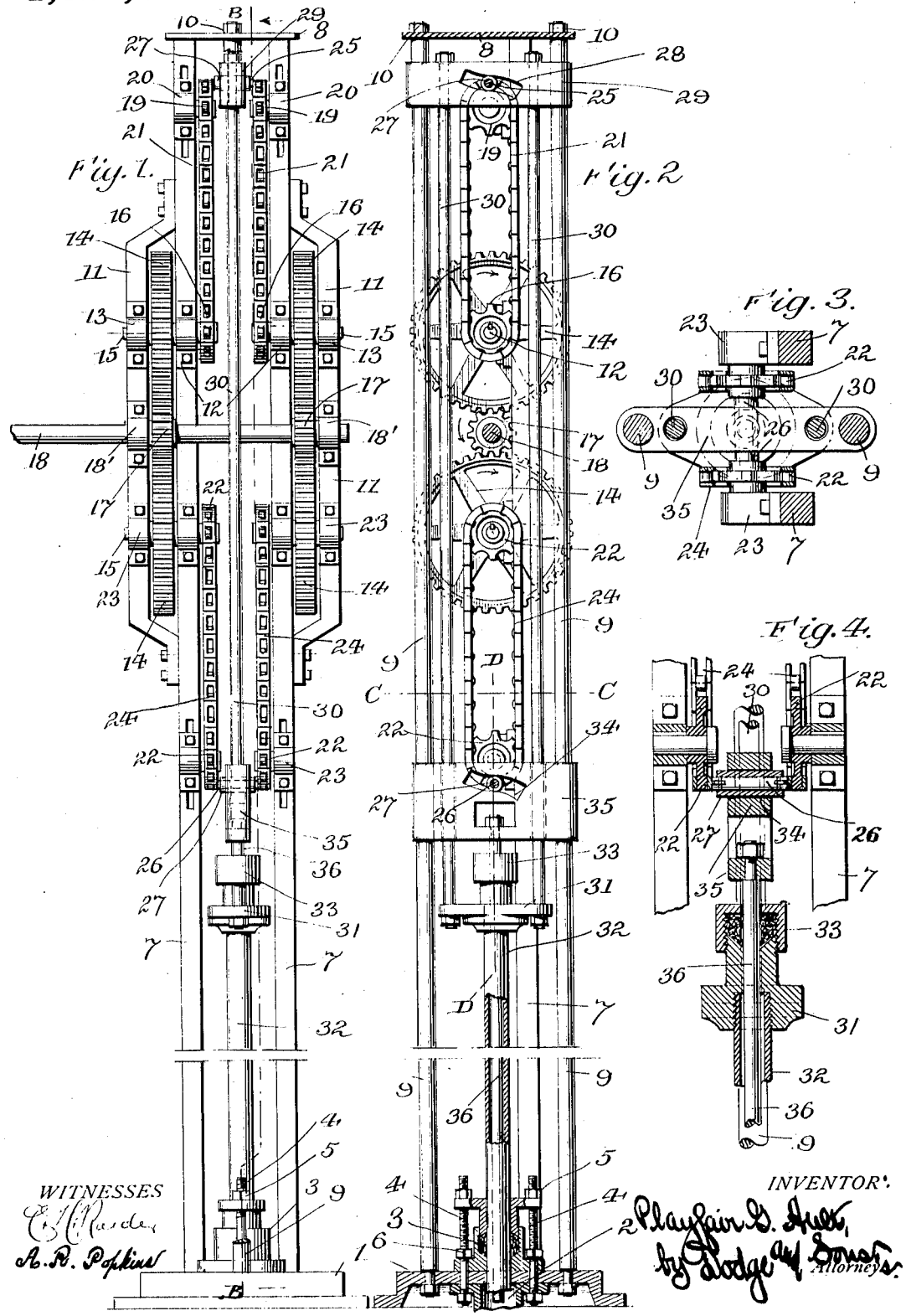
P. G. AULT.
PUMP OPERATING MECHANISM.
APPLICATION FILED MAY 15, 1911.
1,021,296. Patented Mar. 26, 1912.

PLAYFAIR G. AULT, OF BIRMINGHAM, ALABAMA.

PUMP-OPERATING MECHANISM.

1,021,296.  Specification of Letters Patent.  Patented Mar. 26, 1912.

Application filed May 15, 1911. Serial No. 627,271.

*To all whom it may concern:*

Be it known that I, PLAYFAIR G. AULT, a citizen of the United States, residing at Birmingham, in the county of Jefferson and State of Alabama, have invented certain new and useful Improvements in Pump-Operating Mechanism, of which the following is a specification.

This invention relates to pump operating devices and particularly to a pump operating device for double plunger pumps in which the speed of movement of the plungers and consequently the rate of flow is maintained constant throughout practically the entire stroke of the pump. To accomplish this result I make use of a mechanism embodying many of the features shown and claimed in my copending application filed February 14, 1911, Serial No. 608,516.

I illustrate the preferred embodiment of my invention in the accompanying drawing, wherein, Figure 1 is a front elevation; Fig. 2 is a vertical section on the line B—B of Fig. 1; Fig. 3 is an enlarged section on the line C—C of Fig. 2; and Fig. 4 is an enlarged section on the line D—D of Fig. 2.

In the drawing, 1 represents the base plate to which is connected the suction pipe 2 and stuffing box 3 by means of bolts 4, provided with nuts 5 and 6. Supported on the base plate are the vertical frame members 7 which are tied together at the top by a cap plate 8. A pair of guides 9 extend between the base and cap plate and are secured thereto by nuts 10.

Attached to the vertical frame members 7 are the offset bearing supporting members 11 of the form clearly shown in Fig. 1. The members 7 and 11 carry bearings 12 and 13 respectively, which carry gears 14 of which there are four. Each gear is mounted between its bearings 12 and 13 on a shaft 15 which extends beyond the bearing 12 and in each case carries a sprocket 16. The shafts 15 are alined in pairs. The gears 14 are all driven by pinions 17 on a shaft 18 which is the driving shaft. This shaft is mounted in bearings 18' carried on the members 11. Consequently all the gears 14 rotate in the same direction.

Above the upper pairs of gears 14 are a pair of axially alined sprocket wheels 19 which are mounted on short shafts turning in bearings 20 carried by the uprights 7. the sprockets 16 heretofore referred to, and a chain 21 passes around each sprocket 16 and its companion sprocket 19. A similar pair of sprockets 22 is mounted between the lower pair of gears 14, being supported by bearings 23 carried by the uprights 7 and a pair of sprocket chains 24 pass around each sprocket 22 and its companion sprocket 16, all as clearly shown in Figs. 1 and 2. The chains 21 and 24 carry cross bars or pins 25 and 26 respectively, each being provided with a roller 27. The upper bar 25 with its roller 27 works in a slot 28 of special form, later to be described, in a cross head 29, sliding on the guide rods 9. This cross head is connected by a pair of connecting rods 30 to a yoke 31 connected to the tubular piston rod 32, the yoke 31 being provided with a stuffing box 33 as clearly shown in Fig. 4. The lower bar 26 with its roller 27 works in a slot 34 similar in form to the slot 28 and the cross head 35 connected directly to the piston rod 36 which works through the stuffing box 33. The rod 36 and the surrounding tubular rod 32 are connected to individual pistons in the usual manner. As double piston pumps are well known in the art, it is unnecessary to describe their construction or operation in connection with this application.

It will be noted that when viewed as in Fig. 2 the gears 14 rotate clockwise. The slots 28 and 34 are identical in their curvature and each consists of two arcs of opposite curvature, the radius of curvature of each arc being twice the pitch radius of the sprockets 16, 19 and 22, which are all shown as of the same diameter. It is conceivable that the sprockets of the upper mechanism might be of different diameters from the sprockets of the lower mechanism, but the principle of the design of the slot is that the radius of curvature is twice the pitch radius of the sprockets with which it coacts. By so forming the slot I am enabled to vary the movement of the cross head in a particular manner and secure thereby a more gradual and preferred rate of reversal of motion of the cross heads. As arranged, the two piston rods of the pump operated by the mechanism shown in the drawings would always move in opposite directions, but it is obvious that the sequence of motion of these piston rods may be varied by varying the positions of the chains on their sprockets or by some of stroke of the pump is dependent upon the distance between the sprockets.

The mechanism possesses peculiar advantages in the operation of deep well pumps, particularly long stroke pumps, because there are no unbalanced rotating parts, and because a considerable saving of space can be effected.

Having thus described the invention what I claim is:—

1. An actuating device for double piston pumps, comprising a supporting frame; guides carried by the supporting frame; cross heads mounted on said guides; piston rods, one connected to each of the cross heads; pairs of parallel endless sprocket chains, one for each cross head; driving and supporting sprockets for the chains; means for simultaneously driving such driving sprockets; and pins one carried by each pair of chains and coacting with a slot in the corresponding cross head to reciprocate said cross head, the said slot consisting of two arcs of opposite curvature, the radius of curvature of the arcs being twice the radius of the sprockets.

2. An actuating device for double piston pumps comprising a supporting frame; guides carried by the supporting frame; cross heads mounted on the guides; piston rods one connected to each of the cross heads; pairs of parallel endless sprocket chains, one pair for each cross head; driving and supporting sprockets for the chains; gears mounted to rotate with the driving sprockets; a shaft; gears carried by said shaft each of said gears meshing with a pair of the gears turning with the sprockets; and pins, one carried by each pair of chains, each coacting with a slot in the corresponding cross head, such slot consisting of two arcs of opposite curvature, the radius of curvature of the arcs being greater than the radius of the sprockets.

3. An actuating device for double piston pumps comprising a supporting frame; guides carried by the supporting frame; cross heads mounted on the guides; piston rods one connected to each of the cross heads; pairs of parallel endless sprocket chains, one pair for each cross head; driving and supporting sprockets for the chains; gears mounted to rotate with the driving sprockets; a shaft; gears carried by said shaft each of said gears meshing with a pair of the gears turning with the sprockets; and pins, one carried by each pair of chains, each coacting with a slot in the corresponding cross head, such slot consisting of two arcs of opposite curvature, the radius of curvature of the arcs being twice the radius of the sprockets.

4. An actuating device for pumps comprising a supporting frame; guides carried by the supporting frame; a cross head mounted on said guides; a piston rod connected to the cross head; a pair of parallel endless sprocket chains; driving and supporting sprockets for the chains; means for driving the driving sprockets; and a pin carried by the chains and coacting with a slot in the cross head, such slot consisting of two arcs of opposite curvature, the radius of curvature of the arcs being greater than the radius of the sprockets.

5. An actuating device for pumps comprising a supporting frame; guides carried by the supporting frame; a cross head mounted on said guides; a piston rod connected to the cross head; a pair of parallel endless sprocket chains; driving and supporting sprockets for the chains; means for driving the driving sprockets; and a pin carried by the chains and coacting with a slot in the cross head, such slot consisting of two arcs of opposite curvature, the radius of curvature of the arcs being twice the radius of the sprockets.

In testimony whereof I have signed my name to this specification in the presence of two subscribing witnesses.

PLAYFAIR G. AULT.

Witnesses:
A. H. GEOHEGAN,
M. F. ETCHISON.